United States Patent [19]

Majewski

[11] Patent Number: 4,474,288
[45] Date of Patent: Oct. 2, 1984

[54] CHECK-OUT COUNTER SYSTEM

[75] Inventor: Stanley J. Majewski, Chicago, Ill.

[73] Assignee: St. Charles Manufacturing Co., St. Charles, Ill.

[21] Appl. No.: 299,023

[22] Filed: Sep. 2, 1981

Related U.S. Application Data

[63] Continuation of Ser. No. 114,419, Jan. 22, 1980, abandoned.

[51] Int. Cl.³ .................. A47F 9/04; B65G 23/44
[52] U.S. Cl. .................................. 198/816; 186/68
[58] Field of Search ........... 186/59 T, 69; 198/323, 198/583, 629, 810, 813, 816, 856, 860, 861; 308/20, 22, 30, 31

[56] References Cited

U.S. PATENT DOCUMENTS

| | | |
|---|---|---|
| 2,058,760 | 10/1936 | Barber . |
| 2,109,210 | 2/1938 | Dunlop . |
| 2,391,272 | 12/1945 | Rose ............................ 308/20 X |
| 2,723,728 | 11/1955 | Crawford . |
| 2,862,599 | 12/1958 | Sinden et al. ................. 198/323 |
| 2,939,571 | 6/1960 | Robertson ..................... 198/816 |
| 3,109,515 | 11/1963 | Schild . |
| 3,127,978 | 4/1964 | Zuercher ..................... 198/862 X |
| 3,129,804 | 4/1964 | Niekamp ....................... 198/857 |
| 3,167,010 | 1/1965 | Worthington et al. . |
| 3,251,458 | 5/1966 | Niekamp et al. ............... 198/810 |
| 3,329,253 | 7/1967 | Tashman . |
| 3,690,411 | 9/1972 | Potrafke ..................... 209/125 X |
| 3,751,122 | 8/1973 | Dubay .......................... 308/63 |
| 3,817,355 | 6/1974 | Haase . |
| 3,878,937 | 4/1975 | Glaser et al. ................. 198/203 |

Primary Examiner—F. J. Bartuska
Attorney, Agent, or Firm—Robert E. Wagner; Ralph R. Rath

[57] ABSTRACT

A check-out counter assembly includes a cabinet that has an open space with guide rails located adjacent opposite edges of the space to receive a conveyor module which is completely self-contained and includes a power source as well as all of the removable components of the conveyor system. In addition, the respective rollers which support a conveyor belt are also designed as modular units which can be removed from the frame without any special tools. The conveyor module is designed so that power is automatically interrupted when the module is removed from the cabinet and the cabinet also has a safety plate which automatically interrupts the electric motor when an obstruction enters the space between the surface of the moving conveyor belt and the adjacent fixed surface of the cabinet.

3 Claims, 5 Drawing Figures

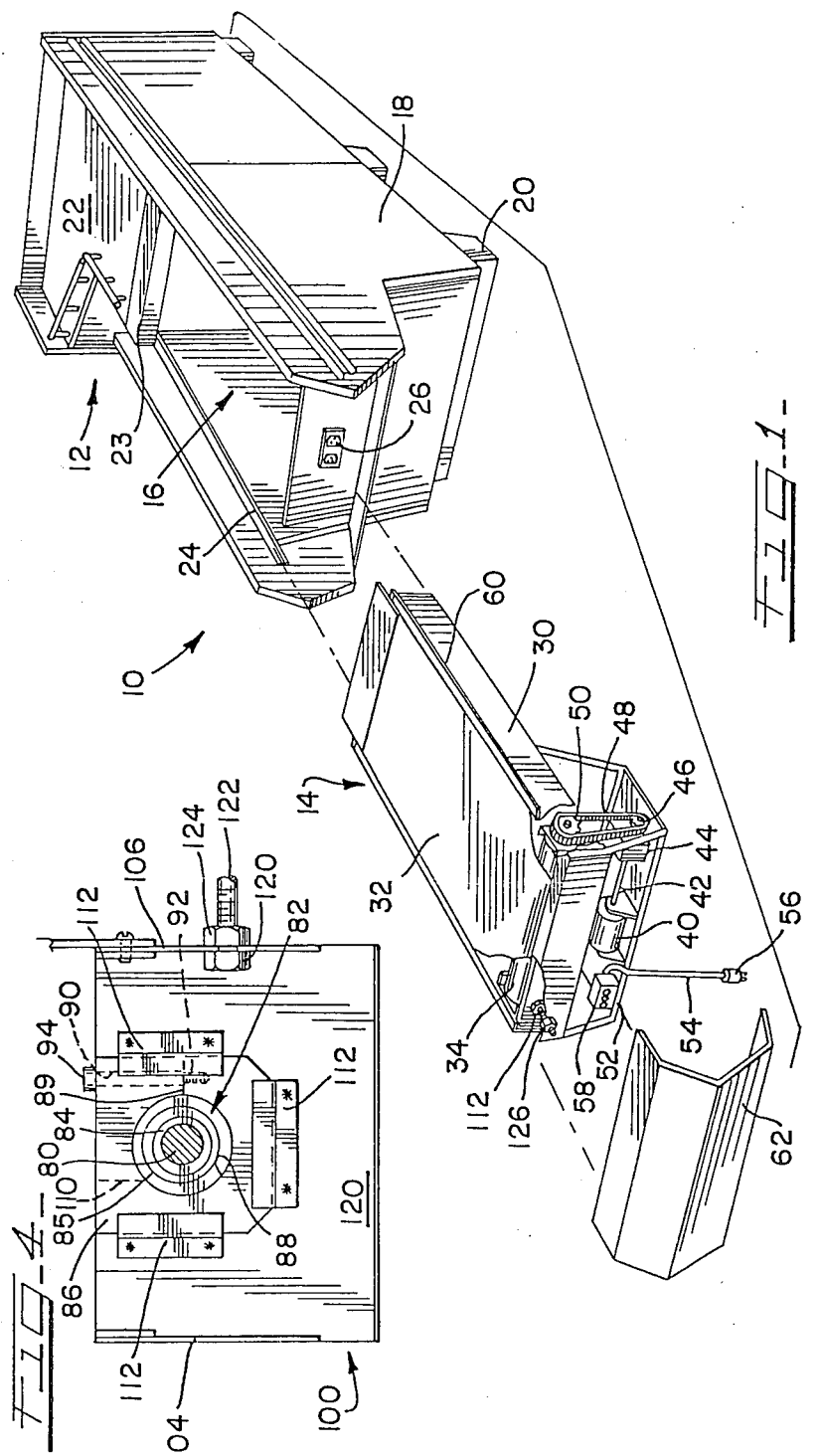

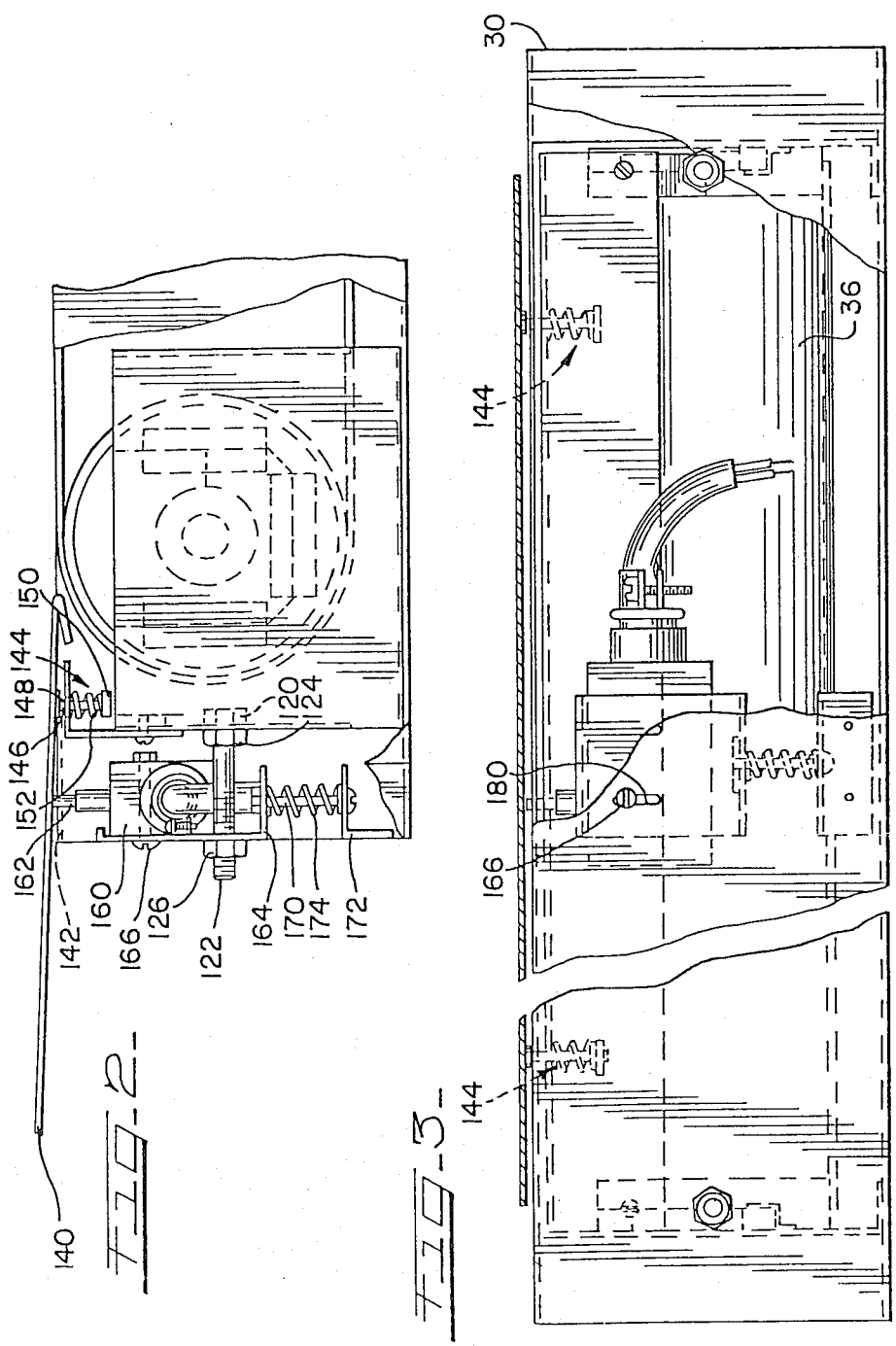

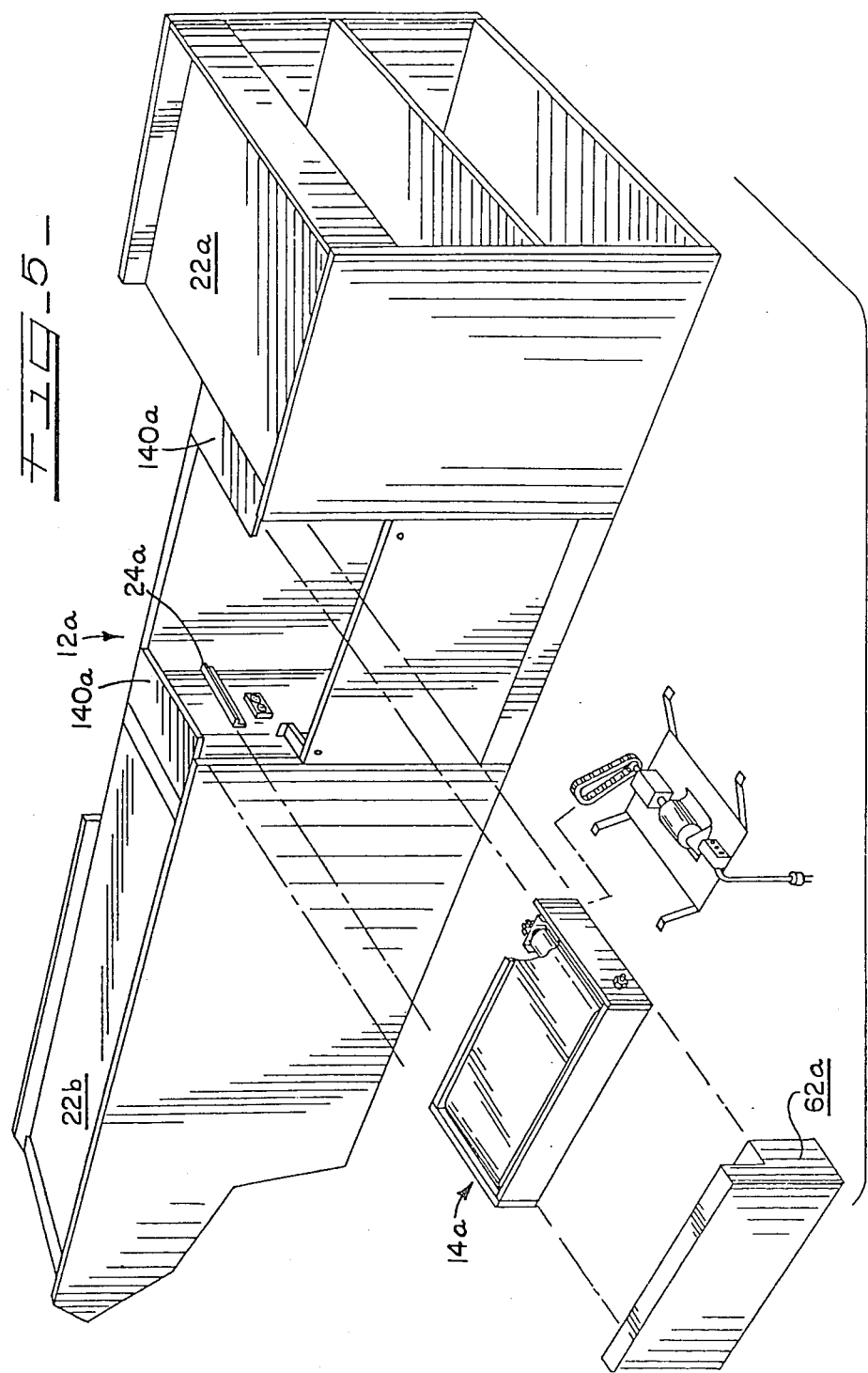

CHECK-OUT COUNTER SYSTEM

REFERENCE TO RELATED APPLICATION

This application is a continuation of U.S. Ser. No. 114,419, filed Jan. 22, 1980 now abandoned.

DESCRIPTION

1. Technical Field

The present invention relates generally to conveying systems and more specifically to an improved counter check-out system having a conveyor system incorporated therein.

2. Background Prior Art

One of the most common items found in a grocery store or other merchandising markets is what is commonly known as a check-out counter. Usually, a check-out counter includes one or more conveyors upon which the articles selected by the purchaser are deposited and the clerk controls the movement of the conveyor to move the articles in close proximity to a cash register. Normally, the conveyor has an upper flight which is generally vertically aligned with a fixed supporting surface that forms part of the counter upon which the articles are placed by the clerk after having been recorded on the cash register.

One of the problems that has been encountered with systems of this type is the inaccessibility of the drive components for the conveyor when maintenance or repair is required. Normally the components of the conveyor, such as the support rollers and the motor drive are fixedly secured inside the counter housing which defines the support for the conveyor. The counter has a removable panel for gaining access to the components which form the drive mechanism and the conveyor belt support mechanism for such repair and maintenance. However, because of the confined space, it is usually difficult to be able to readily position all components so that they are readily accessible through a single control panel.

Also, in check-out counters of this type, the edge of the fixed supporting surface is generally positioned in close proximity to the edge of the upper flight of the conveyor belt to prevent articles from dropping into the space or gap between the belt and the article supporting surface. However, many items that are purchased in such merchandising areas are fairly thin and it is difficult to prevent such thin articles from passing through the space between the conveyor and the fixed article supporting surface. Another possibility that has received some attention is the fact that it is conceivable for the purchaser or the clerk to inadvertently place their fingers into this small space, such as in attempting to prevent an article from entering that space. Thus, a possibility exists for someone to have his fingers caught between the surface of the conveyor belt and the adjacent fixed surface upon which the articles are ultimately deposited.

To prevent such occurrence, it has been proposed to provide a safety device which will automatically interrupt the motion of the conveyor whenever an obstruction is moved into the space between the conveyor and the adjacent guide surface or take-off plate. Examples of such safety devices are disclosed in U.S. Pat. Nos. 3,129,804 and 3,251,458. Both of these patents disclose a check-out counter system wherein a conveyor receives the articles from the purchaser and the clerk records the prices of the articles on an ECR register or optic scanner device. Both of these systems also disclose a system wherein conveyor drive is interrupted whenever an article reaches a predetermined position along a path and also incorporates a safety mechanism for interrupting the drive for the conveyor whenever an obstruction enters the area between the surface of the moving conveyor belt and the adjacent article receiving support surface.

However, the safety systems disclosed in the above patents are rather complicated in construction and have not acquired any degree of commercial success. It is believed that one of the shortcomings of the patented systems is the mounting arrangement for the plate which may result in binding which could prevent movement of the plate to interrupt the circuit.

SUMMARY OF THE INVENTION

According to the primary aspect of the present invention, the conveyor assembly for a check-out counter apparatus is a unique modular unit that is easily inserted and removed from the remainder of the apparatus for maintenance and/or replacement. The conveyor module includes a frame that has a drive roller and an idler roller supported thereon with a clip fastened belt or endless conveyor belt entrained over the rollers. The drive roller is driven by a suitable power source, preferably an electric motor, and the periphery of the frame has a pair of guide members.

Each of the rollers is a self-contained unit that can easily be removed from the frame for maintenance or replacement. Each roller has a shaft portion extending from opposite ends thereof with a bearing supported on the shaft. The bearing has an inner race which is secured to the shaft to rotate therewith and an outer race which is received into a retainer, preferably of rectangular peripheral configuration. The retainer is received into an elongated slot defined in a support member which is supported on the frame and the support member is adjustable with respect to the frame to accurately position the axis of one roller with respect to the other roller.

In the illustrated embodiment, two such support members are utilized on opposite ends of the idler roller and are individually adjustable to accurately orient the axis of the rollers and also to adjust the tension of the endless belt.

In this embodiment of the invention, the drive roller also has one support member which is adjustable for belt tracking or aligning with respect to the frame while the second support member is fixed with respect to the frame and the shaft portion at this end has a drive pulley secured thereto which is driven by the electric motor through a drive chain or other mechanism.

With this arrangement, the entire conveyor module can easily be inserted into a counter that forms part of a check-out assembly by sliding the unit onto a pair of spaced guide rails that are defined on the inner walls of a cabinet and be positioned in close proximity to a fixed article receiving surface located on the upper surface of the cabinet. In the event any maintenance or repair is required, it is only necessary for the operator to remove an end panel from the cabinet and remove the entire conveyor module for either replacement or maintainence. If damage has occurred to either of the rollers, either roller can be readily readily be removed by merely lifting the entire unit vertically to remove the retainers from the respective slots and the entire roller can be replaced.

The retainer unit is also designed to be easily installed and/or removed when replacement or maintenance is required. The retainer member consists of a substantially rectangular block that has a center circular opening therein. A single slit extends from the periphery of the opening to the periphery of the block and the block has an opening therein extending from the peripheral surface to the slit with a threaded bore aligned with the opening so that a threaded member can be received into the threaded bore for gripping the outer race of a bearing within the opening.

According to another aspect of the invention, a simplified safety system is incorporated into the apparatus to prevent injury to an operator or attendant and also to prevent destruction of articles received onto the conveyor in the event the articles are small and can possibly become lodged in the area between the article receiving surface and the periphery of the conveyor. The safety system consists of a safety or guide plate that is located between the edge of the fixed article receiving surface and the upper run of the conveyor and is positioned slightly below the upper surface thereof. The guide plate is supported on the fixed support through first and second transversely spaced biasing means that define the sole connection between the plate and the support. The biasing means normally bias the plate into a first position in juxtaposed relation to the fixed support and act as a guide for moving articles from the end of the conveyor to the fixed article supporting surface. A normally open switch is supported on the fixed support and has an actuator that is biased towards the guide plate and is also in a circuit to the electric motor. When the guide plate is in the first position, the actuator is forced to a closed condition to maintain the circuit to the electric motor. In the event that an obstruction is received between the edge of the guide plate and the adjacent surface of the moving belt, the guide plate will be forced away from the first position to allow the actuator to move to an open condition and interrupt the circuit to the electric motor.

Another safety feature incorporated into the checkout counter apparatus includes a mechanism that would prevent the conveyor module from being removed from the cabinet while power is still being supplied to the electric motor. The power to the electric motor is received from an outlet that is located on the cabinet adjacent the guide rails. The electric motor has a cord and a plug at the end of the cord that is received into the outlet. The cord has a length which is substantially less than the length of travel required to remove the conveyor module so that the plug will be automatically removed from the outlet if the conveyor module is removed.

BRIEF DESCRIPTION OF SEVERAL VIEWS OF DRAWINGS

FIG. 1 is an enlarged perspective view of the checkout counter assembly constructed in accordance with the present invention with certain parts thereof broken away for purposes of clarity;

FIG. 2 is a fragmentary side elevation view of the end portion of the conveyor module;

FIG. 3 is an end view of the conveyor module;

FIG. 4 is an enlarged fragmentary view of the support assembly for the conveyor rollers; and, FIG. 5 is a perspective view similar to FIG. 1 showing a modified form of the present invention.

DETAILED DESCRIPTION

While this invention is susceptible of embodiment in many different forms, there is shown in the drawings and will herein be described in detail preferred embodiments of the invention with the understanding that the present disclosure to be considered as an exemplification of the principles of the invention and is not intended to limit the invention to the embodiments illustrated.

FIG. 1 of the drawings generally illustrate a checkout counter assembly, designated by reference 10. The check-out counter assembly or apparatus includes a cabinet 12 and a conveyor module 14 which is adapted to be received in a space 16 defined in cabinet 12.

The cabinet module 12 includes side panels 18, support members 20 secured to the bottom wall (not shown) and a top fixed article receiving surface 22 having a lateral edge 23. The side panels 18 have a pair of spaced parallel side rails 24 which are designed to support the conveyor module 14 as will be described later. The cabinet module also has an electrical outlet box 26 which is connected to a suitable electric power source (not shown).

According to the primary aspect of the invention, the conveyor module 14 is designed and constructed so that all of the components are supported on a single frame which can be inserted and removed as a unit into space 16 in cabinet 12. As illustrated in FIG. 1, the conveyor module includes a rigid peripheral frame 30 which has an endless conveyor belt 32 supported therein. Conveyor belt 32 is supported on a pair of spaced generally parallel rollers 34 and 36. The roller 34 is driven by a suitable power source, preferably a reversable electric motor 40 which has an output shaft 42 leading to a speed reducer unit 44. Speed reducer unit 44 has an output sprocket 46 connected by a sprocket chain 48 to a drive sprocket 50 mounted on the end of drive roller 34. The motor and speed reducer unit are supported on a platform 52 which is suspended below the main frame 30 and is considered an integral part thereof.

The electric motor 40 has a power cord 54 with a plug 56 at the end thereof. The cord leads to a control box 58 also supported on platform 52 to control operation of a reversable motor.

The frame 30 also has a pair of guide members 60 secured to opposed surfaces thereof with the guide members having a length at least equal to the length of the rails 24 and are adapted to be slidably received thereon so that the conveyor module can be slid as a drawer into the space 16. Of course, the weight of the unit will maintain the unit in position. If desired, suitable latch mechanisms may be provided for locking the power drawer or conveyor module drawer into the space 16. After the module has been inserted into the space 16, a front cover panel 62 is preferably placed over the exposed end portion of the conveyor module to enclose all of the components within the confined space defined by the periphery of the cabinet.

One of the safety features incorporated into the conveyor module is an automatic interruption of the power to the motor should the power module be removed from the cabinet. This is accomplished by making the length of the cord substantially less than the length of travel required for removal of the power module from the cabinet. Stated another way, the length of the cord is substantially less than the length of the side rails 24 which support the conveyor module so that when the conveyor module is being removed, the plug will automatically be separated from the outlet before the guides are separated from the guide rails.

According to another aspect of the invention, the respective conveyor rollers 34 and 36 are supported in a fashion to be readily removable for maintenance, repair or replacement. One of the difficulties that has been encountered in units of this type is the service life of the bearings that support the opposite ends of the conveyor rollers. Conventionally, the bearings are supported directly on the frame and require substantial time for removal and replacement. According to the present invention, the entire roller unit is designed to be removed without the need of any special tools and is also capable of being accurately positioned with respect to the opposite roller so that the axes of the rollers extend truly parallel to each other.

As illustrated in FIGS. 2 and 4, the idler roller 36 has shaft portions 80 extending from opposite ends thereof with a roller bearing 82 supported on each of the shaft portions. The roller bearing 82 has an inner race 84 that is press fitted onto the peripheral surface of the shaft 80 to rotate therewith. The bearing also has an outer race 85 which is supported in a retainer means or member 86 that consists of a substantially rectangular block that has a circular opening 88 therein. An elongated slit 89 extends from the periphery of the opening to one side wall or peripheral surface of the block and the block has an opening 90 extending from a perpendicular surface and terminating at the slit 89. A threaded bore 92 is produced in the block extending from the opposite surface of the slit 88 and is aligned with opening 90. A tensioning screw 94 is received into opening 90 and threaded bore 92.

In assembling the bearing and retainer onto the end of the roller, the inner race of bearing 82 is first press fitted onto the end of shaft 80 and the retainer is then telescoped over the outer race of the bearing. The threaded screw 94 received into opening 90 and threaded bore 92 is then tightened to a desired torque to securely interconnect the outer bearing race with the retainer unit. A second bearing and retainer unit of identical configuration are then assembled on the opposite end of the idler roller 34.

The two retainer units are adapted to be received in support means or brackets 100 that are specifically designed so that the roller can be positioned and removed without the use of any tools. More specifically, each support bracket consists of a spaced plate 102 that has flanges 104 and 106 extending from opposed edges as well as a flange 108 from the bottom edge. A slot 110 extends from the upper edge of plate 102 and terminates intermediate upper and lower edges of the plate. The support means 100 also has guide means that define an elongated slot for receiving and supporting the retainer. The guide means or slot is defined by a plurality of Z-shaped channels 112 (three in number that are located at right angles to each other to define an elongated slot that it opened at the upper end thereof).

The respective support brackets 100 are positioned adjacent the side walls of frame 30 and are independently adjustable with respect to the frame. For this purpose, the flange 104 or 106 has an opening with a threaded nut 120 surrounding the opening and welded to the flange. A threaded stud 122 is received into the nut 120 and also has a lock nut 124 threaded thereon.

The opposite end of the threaded stud extends through an opening in the end wall of the frame and has a further nut 126 threaded thereon. The independent adjusting screws for the respective support brackets 100 supporting opposite ends of the idler roller 36 will provide a dual function of setting the desired tension on the conveyor belt and can also be utilized as an adjusting arrangement for accurately positioning the axis of the idler roller with respect to the frame and the drive roller so that the axes of the two rollers will be accurately aligned and extend parallel to each other. This arrangement will substantially increase the service life of the bearings since any misalignment will tend to cause undue wear on the bearings.

The second or drive roller 34 again is constructed in a fashion similar to the idler roller described above in that two bearings are supported on opposite ends of the roller and have retainer units secured thereto. The retainer units received in support brackets similar to brackets 100 so that the unit can simply be dropped in without any need for any fastening means since the weight of the unit will hold the retainers within the slots through gravitational forces. If desired, both of the brackets supporting opposite ends of drive roller 34 may be adjustable but in the preferred form, the support bracket which supports the end of the shaft having the drive pulley 50 thereon is preferably fixedly secured to the frame. The support bracket for the opposite end of the drive roller is preferably adjustable as described above so that the roller axis can be accurately positioned perpendicular to the path for the conveyor belt 32.

In its assembled condition within cabinet 12, the conveyor module 14, more specifically the upper flight of conveyor belt 32, is horizontally aligned with the fixed article receiving surface 22 and will extend perpendicular to edge 23. As will be appreciated, in order to prevent wear of the surface of the conveyor belt, a small gap is maintained between edge 23 of the fixed article receiving surface 22 and the surface of the belt. This gap is preferably at a minimum and has in the past created a safety hazard because of the possibility of the check-out clerk or the customer getting their fingers wedged between the surface of the moving belt and the fixed edge of the article receiving surface. While, as explained above, attempts have been made to provide necessary safeguards for such occurrence, these have not to date been accepted in the industry.

According to another aspect of the invention, the check-out counter assembly includes a simple safety feature for automatically interrupting the operation of the motor in the event that any obstruction enters the area between the belt and the adjacent edge of the support surface. As illustrated in FIGS. 2 and 3, a safety plate or guide plate 140 extends from the edge of frame 30 and is adapted to overlap the surface 22 on the counter 12. The safety plate 140 is movably supported on a fixed support 142, which in the embodiment illustrated in FIG. 2 is part of frame 30. Plate 140 is releasably retained on support plate 142 through first and second identical transversely spaced biasing means 144. Each biasing means 144 consists of a circular rod or screw 146 that extends through an opening 148 in support plate 142 and is secured, as by welding, to the lower surface of guide plate 140. The threaded rod or screw has a nut 150 threaded on the free end thereof with a coil spring 152 telescoped over the rod. The spring 152 engages the nut 150 at one end thereof and the lower surface of support plate 142 at the opposite end thereof. Thus, the two biasing means 144 will normally bias the safety plate 140 into a first position illustrated in FIG. 2 wherein the plate 140 is in substantial contiguous engagement with support plate 142.

The safety mechanism also includes a switch 160 which has an actuator 162 which is normally bias to an open position by an internal spring. Switch 160 is secured to a support bracket 164 which is attached to the end wall of frame 30 through fastening screws 166. As illustrated in FIGS. 2 and 3, preferably the support 164 and switch 160 are biased to a first upper most position and are movable and releasably retained in positions other than the first position. For this purpose, a screw 170 extends between bracket 164 and a further bracket 172 that forms part of frame 30. A coil spring 174 is telescoped over the screw 170 and the nut on the end of the screw can be utilized to adjust the compression of the spring and also define the first or upper most position for the switch assembly. In order to accommodate movement of the switch assembly from the first position, the fasteners 166 utilized for securing the switch assembly to the frame extend through elongated slots 180 defined in the end wall of frame 30. Thus, the actuator or plunger 162 can be accurately positioned with respect to the lower surface of safety plate 140 so that the switch will be opened with a minimum amount of vertical movement of guide plate 140.

Of course, the switch 160 is incorporated into the circuit for the drive motor so that the circuit is automatically interrupted when the switch actuator 162 moves to an open condition. The simplicity of the safety feature is obvious from the above description. To incorporate the safety feature into the counter assembly, it is only necessary to position two holes in the upper support plate 142 and insert the threaded members 146 through the openings.

The springs 152 are then telescoped over the free ends of the members and the nuts 150 threaded thereon. Of course, the nuts 150 can be adjusted to vary the tension of the springs 152.

As can be appreciated from the description of the safety device, the safety device is of simple construction wherein the safety or guide plate is totally unobstructed except for the biasing springs to prevent any jamming or binding between the safety plate and the supporting structure. From an inspection of FIGS. 2 and 3, it will be noted that the only connection between the safety plate 140 and support plate 142 is the first and second transversely spaced biasing means 144 which are located on opposite sides and equally spaced from the upwardly biased actuator or plunger 162 which only engages the surface of plate 140 but is not connected thereto. Thus, the safety plate 140 is free to move upwardly whenever any external force is applied to the edge of the plate adjacent the upper run or surface of the conveyor belt.

It will be noted that in the embodiment illustrated in FIGS. 1 through 4, the safety plate is supported on the removable conveyor module and the conveyor module is moved endwise into space 16 to be positioned in close proximity to the lateral edge 23 of article support surface 22. In this embodiment, the guide rails 24 extend perpendicular to edge 23 and the conveyor belt is essentially designed to extend from one end of cabinet 12 to lateral edge 23. However, in other instances it may be desirable to have a work supporting surface located at opposite ends of the conveyor so that articles can initially be supported on a first surface, transferred to the conveyor from the first surface and then removed from the conveyor and deposited on to the second surface.

Referring now to FIG. 5 of the drawings, a slightly modified form of the invention is disclosed therein. In the embodiment illustrated in FIG. 5, the cabinet 12a has a first upper article receiving supporting surface 22a located at one end thereof with a second article supporting surface 22b at the opposite end thereof. Conveyor module unit 14a is designed to be located between the two article supporting surfaces.

For this purpose, the space 16a opens laterally to the side of counter 12a and guide rails 24a extend parallel to the lateral edges of the surfaces 22a and 22b. Also, in this embodiment, the support plate (not shown in FIG. 5) forms part of the article supporting surface 22a so that the guide plate or safety plate 140a is supported on the cabinet rather than on the frame for the conveyor module 14a. Of course, if desired, a second safety plate 140a could be positioned adjacent the article supporting surface 22b if the conveyor module has a reversable motor so that there would be a safety plate regardless of the direction of movement of the endless belt.

As can be appreciated from the above description, the present invention provides a unique modular unit wherein all of the components that need be serviced or repaired, are located in readily removable sections and components therein can easily be removed and replaced in a minimum period of time which reduces the maintenance required since the entire assembly or subassembly can be removed and replaced so that the defective components can be returned to a maintenance shop where adequate tooling is available to replace the various components.

I claim:

1. A conveyor module including a frame, a rotatable drive roller and rotatable idler roller on said frame with an endless belt entrained over said rollers, one of said rollers having a shaft extending therefrom and a bearing on said shaft, said bearing having an inner race rotatable with said shaft and an outer race, rectangular retainer means supporting said outer race, support means having guide means defining a substantially rectangular upwardly-directed slot for receiving said rectangular retainer means so that said retainer means is retained in said slot by gravity, and adjusting means for moving said support means with respect to said frame.

2. A conveyor module as defined in claim 1, in which said shaft extends from opposite ends of said one of said rollers with said bearing on one end thereof, a second bearing on the opposite end thereof with a second retainer means supporting said second bearing and a second support means having guide means receiving said second retainer means and second independent adjusting means between said frame and said second support means.

3. A conveyor module as defined in claim 1, in which said retainer means includes a substantially rectangular member having a center opening and a slit extending from said opening to a periphery of said member, said member having an opening extending from said periphery across said slit and a threaded screw in said opening across said slit adjustable to grip said outer race in said center opening.

* * * * *